United States Patent [19]

Bielfeldt

[11] Patent Number: 5,404,810
[45] Date of Patent: Apr. 11, 1995

[54] METHOD FOR THE CONTINUOUS MANUFACTURE OF CHIP BOARDS

[75] Inventor: Friedrich B. Bielfeldt, Paehl, Germany

[73] Assignee: Maschinenfabrik J. Dieffenbacher GmbH & Co., Eppingen, Germany

[21] Appl. No.: 184,150

[22] Filed: Jan. 21, 1994

[30] Foreign Application Priority Data

Jan. 21, 1993 [DE] Germany .................. 43 01 594.8

[51] Int. Cl.⁶ .................. B30B 5/06; B30B 15/34
[52] U.S. Cl. .................. 100/38; 100/41;
100/93 P; 100/154; 156/324; 156/583.5;
264/280; 425/371
[58] Field of Search .................. 100/35, 38, 41, 93 P,
100/93 RP, 154; 156/311, 324, 555, 583.5;
264/120, 280; 425/371

[56] References Cited

U.S. PATENT DOCUMENTS

| | | | |
|---|---|---|---|
| 3,517,552 | 7/1970 | Knapp | 100/93 P |
| 3,929,065 | 12/1975 | Csordas et al. | 100/154 |
| 3,945,789 | 3/1976 | Boman | 425/371 |
| 4,517,148 | 5/1985 | Churchland | 264/112 |
| 4,645,632 | 2/1987 | Böttger | 264/120 |
| 4,874,657 | 10/1989 | Lo et al. | 264/280 |
| 4,923,384 | 5/1990 | Gerhardt | 425/371 |
| 5,042,372 | 8/1991 | Bielfeldt | 100/38 |
| 5,112,209 | 5/1992 | Ahrweller | 425/371 |

FOREIGN PATENT DOCUMENTS

| | | | |
|---|---|---|---|
| 85838 | 11/1971 | Germany | 100/93 RP |
| 2052159 | 4/1972 | Germany | 425/371 |
| 2343427 | 3/1975 | Germany . | |
| 3133792 | 3/1983 | Germany . | |

Primary Examiner—Stephen F. Gerrity
Attorney, Agent, or Firm—Foley & Lardner

[57] ABSTRACT

A method for the continuous production of boards made from feedstock includes A) providing a continuously operating press with an entry adjustment device being movable to define a variable angle entry gap through which the board passes such that the board is subject to compression forces, the variable angle entry gap defined by at least first and second independently variable angle entry gap portions, the first and second portions being flexibly connected and the second portion being flexibly connected at least to one of the heating plates of the press table and press ram; B) moving the feedstock through the variable angle entry gap; C) setting the first independent variable entry gap at a first angular value which falls in a first range from approximately 0.5° to approximately 5.0° relative to a horizontal plane thereby compressing the feedstock under first compressive forces as the feedstock is moved through the first independent variable entry gap; and D) setting the second independent variable entry gap at a second angular value which falls in a second range from approximately 7.0° to approximately 1.0° relative to the horizontal plane, thereby compressing the feedstock under second compressive forces as the feedstock is moved through the second independent variable entry gap portion. A continuously operating press performs the above method.

5 Claims, 10 Drawing Sheets

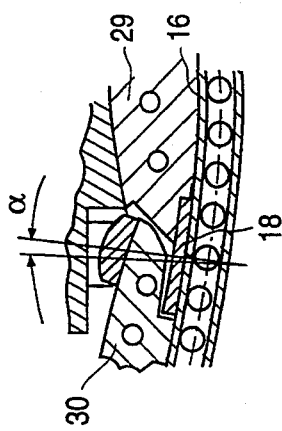
FIG. 2.1
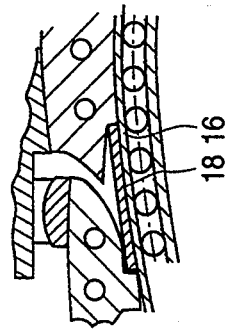
FIG. 2.2
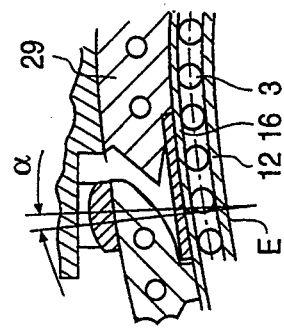
FIG. 2.3
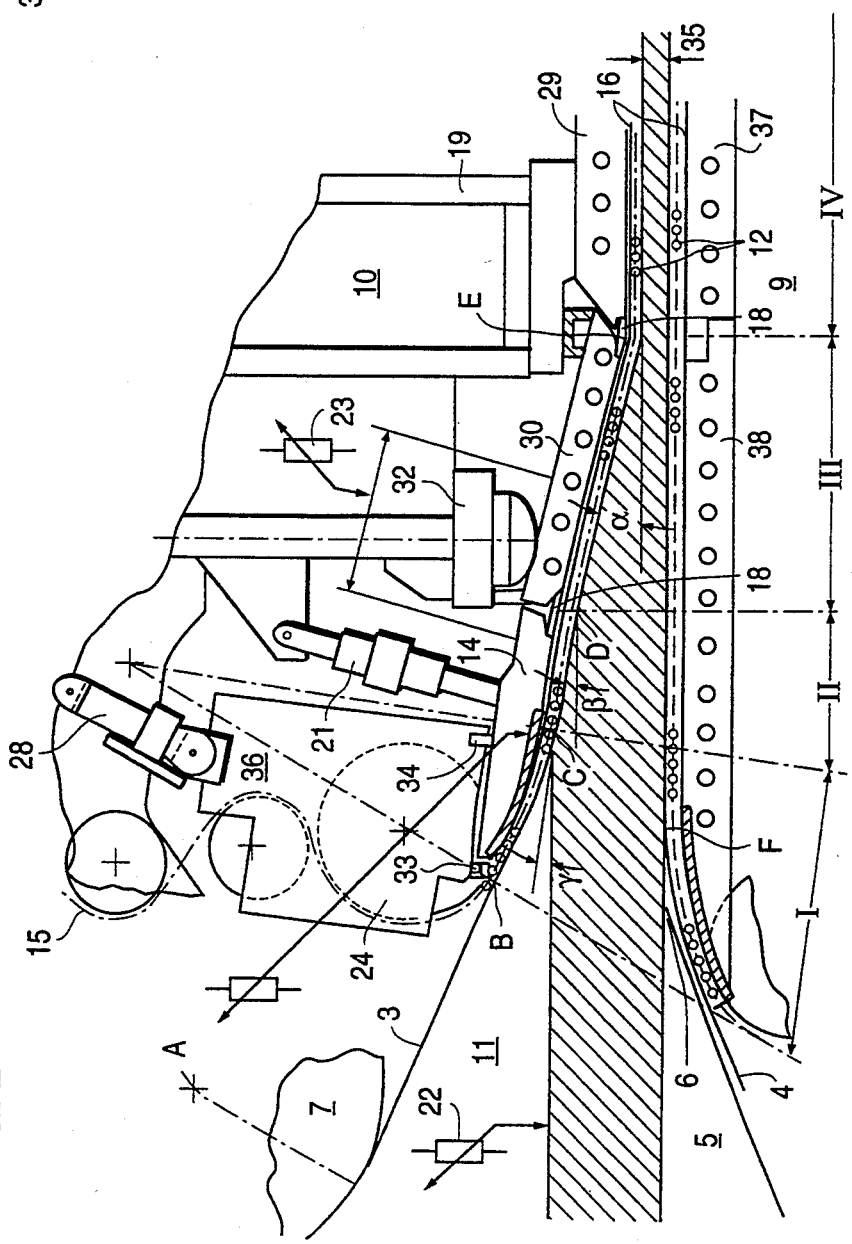
FIG. 2

METHOD FOR THE CONTINUOUS MANUFACTURE OF CHIP BOARDS

BACKGROUND

1. Field of the Invention

The invention relates to a method for the continuous manufacture of chip boards, fiber boards, plastic boards and plywood and to a continuously operating press for performing the method.

2. Description of the Related Art

It is known from a number of methods and apparatus concerning the manufacture of boards to vary the compression angle in the entry gap with adjusting apparatus in the ram and/or in the press table in order to adapt it to requirements regarding the practical strength of the wood material boards and of the chip mat structure (the material to be pressed). According to German Patents 23 43 427, 31 33 792 and 34 13 396 it is known to adapt the entry gap by varying the compression angle in accordance with the practical requirements of the board to be made from wood material. Varying the pressure characteristic in the entry system, however, is possible only within narrow limits by means of a steady compression over a relatively long entry section.

Present-day practical specifications for chip boards (e.g., for varnishable surfaces) require, on the other hand, raw density profiles with a density of about 1100 kg/m$^2$ in the top layer area of the board surface. This requires a rapid compression of the mat or raw material in the press entry gap, i.e., a steep pressure rise at the start of the pressing. According to embodiments described in German Patent 19 38 280 and in German OS 37 34 180, in the case of fiber boards, especially thin boards of 2.5 mm to 5 mm thickness, an extremely rapid top layer compression can be achieved by pre-curved convex compression sections in the entry area by controlling the pivotal supporting structure.

The development of continuous press technology with rolling support now permits the construction of very long presses with accordingly high steel belt velocities and low specific compression factors. The fast compression of the covering layers in a pre-curved entry gap, practiced according to German Patent 19 38 280, DE-OS 37 34 180 and European Patent Application 0 144 163, lead due to the higher entry velocities to blowouts along the entry width on the covering layer, due to the progressive compression in the convex entry gap, when contact with the mat begins between the upper and lower steel band. In other words, when the compression of the mat begins, the air accumulated in the extremely pre-compressed mat has to escape abruptly. Depending on the fiber structure or covering layer structure, for example in the case of chip boards with a relatively high dust content, the air permeability of the precompressed covering layer changes. If the air permeability is poor and the entry velocities are high, the air in the mat escapes explosively, forming clouds of dust or fiber which leads to streaking on the finished board at the exit of the continuously operating press. Sometimes entire areas of the covering layer, amounting for example to 100 cm$^2$ and more, burst out of the middle layer, so that not only is the surface blemished, but also the optimum practical requirements of the finished board, e.g., laminability or flexural strength, cannot be achieved.

Precompression sections of the above-described kind, with a rigid transition in accordance with DE-OS 37 34 180 and EP-OS 0 144 163 in a straight precompression area, permit only the adaptation of the vertical compression rate to a varying permeability of the covering layers by modulating the entry and production velocities. Variations of the air escape characteristics of the covering layer cannot be compensated for without varying the rate of production; for example, if the dust content is higher or the fiber structure has poor permeability in the covering layers the production rate has to be lowered, resulting in a substantial limitation economically.

Another important limitation to be mentioned is that, if the horizontal-to-vertical compression ratio is the same at the point of contact with the chip mat, the angle of the entry arc angle with respect to the secant angle is twice as great, i.e., in comparison to a linear mat compression along a secant the rate of the escape of air at the arc due to the progressive compression along the arc is twice as great at the arc, and this intensifies the blow-out effect. The negative blow-out effect, which is disclosed in the state of the art cited above, according to the progressive compression of the mat in the pre-curved front entry section with a transition to the rectilinear, variable entry gap, has been minimized by the two-joint system according to DE-OS 39 18 757. However, what has not been solved is the problem of the rapid covering layer compression in thin fiber boards, because the initial compression section ahead of the first joint is substantially longer than the compression section that follows. Another disadvantage of the extremely long precompression section is that in the finished product it results in greater pre-hardening and thus more costly sanding as well as poorer raw density profiles (strength) in the covering layer.

The adjustable entry systems known heretofore have, in addition to the deficiencies described thus far, still more serious disadvantages tied to the apparatus:

a) After the chip or fiber mat makes contact with the idler drums, an extreme drop in the pressing force occurs and thus an unacceptable pre-hardening and embrittlement with cracking at the surface of the upper covering layer correspondingly occurs.

b) The same problem occurs in the apparatus according to German Patent 38 16 511. After the deflection of the steel band on the curved section of the roller frame, the steel bands are supported on friction surfaces with virtually no pressure up to the point of entry into the roller rods.

c) In the embodiment of DE-OS 37 34 180, express reference is made to an entry section separate from the main press section. This system-related apparatus is connected to the main press only by the steel bands. At the transition point, the intense application of the pressing force curve has to occur, without any controllable influence on the rest of the pressing procedure.

SUMMARY OF THE INVENTION

The problem to which the invention is addressed is to improve the generic procedure discussed above, and to design a plant accordingly, so that, for the production of fiberboard in chiefly thin thicknesses of, for example, 5 mm and less, at first a rapid build-up of pressure is produced that is variable to allow for a negative blow-out effect, and then to set a slower compression for the middle layer. On the other hand, for thicker chip boards and fiber boards, of for example 16 mm and more, the invention is directed toward producing a slow initial pressure build-up for the slower displacement of the greater amount of air, but a variable one according to the permeability, and shortly thereafter to accelerate the rate of compression, again in a controlled manner, so as to increase the strength of the board, thereby improving the overall quality of wood chip, fiber, plastic and other boards.

The above problem is solved by a method for the continuous production of boards made from feedstock, the method including the steps of:

A) providing a continuously operating press including a press table having
   a heating plate;
   a press ram having a heating plate and being movable relative to the press table to define an adjustable press gap therebetween;
   driving drums;
   idler drums;
   flexible continuous steel bands which are driven by the driving drums and guided by the idler drums around the press table and press ram, the steel bands transferring press pressure from the press table and press ram to the feedstock and drawing the feedstock in a moving direction through the press;
   roller rods having a rotational axis transverse to the moving direction of the board, the roller rods supporting the flexible continuous steel bands;
   an entry adjustment device disposed adjacent the press gap, the entry adjustment device being movable to define a variable angle entry gap therein through which the feedstock passes such that the feedstock is subject to compression forces, the variable angle entry gap defined by at least first and second independently variable angle entry gap portions, said first and second independently variable angle entry gap portions being flexibly connected to each other and said second independently variable angle entry gap portion being flexibly connected at least to one of the heating plates of the press table and press ram;

B) moving the feedstock through the variable angle entry gap;

C) setting the first independent variable entry gap portion at a first angular value which falls in a first range from approximately 0.5° to approximately 5.0° relative to a horizontal plane thereby compressing the feedstock under first compressive forces as the feedstock is moved through the first independent variable entry gap portion;

D) setting the second independent variable entry gap portion at a second angular value which falls in a second range from approximately 7.0° to approximately 1.0° relative to the horizontal plane thereby compressing the feedstock under second compressive forces as the feedstock is moved through the second independent variable entry gap portion.

The invention offers the following advantages over the state of the art:

The rectilinear press stages II, III and IV (see FIGS. 1-10), which go into action after entry at the roller rods, are linked flexibly and positively together under tension, so that, depending on the particular process requirement, any optimum pressing force profile curve can be set at the transition from stages II to III and from stages III to IV.

Due to the positive or negative angular settings of press stages II, III and IV with respect to one another it is possible, on account of the highly flexible transitions, i.e., the convex or concave positive supporting action, to preset the force and compression profiles at the entry, which heretofore has not been possible in the described state of the art.

Thus, the following process variations can be set up in an optimum manner:

Setting for board thicknesses, e.g., 10 mm and greater, with poorer air permeability in the covering layer with controlled low angle venting in precompression stage II.

Setting for board thicknesses of 16 mm and greater with good air permeability in the covering layer.

Setting for board thicknesses of 5 mm and less with relatively little air inclusion, so that rapid covering layer compression with a steep press angle setting ($\beta$ range) can be used in the precompression section, and Setting for chip boards with a high raw density profile requirement, e.g., approximately 1100 kg/m², at about 0.2 mm below the covering layer, with relatively good air permeability in the covering layer, so that the specific pressing force can be brought to bear by turning post-compression stage III to a negative setting of the pressing angle $\alpha$.

Depending on the requirements of the use to which the boards will be put and the structure of the mats of chips or fibers, as well as the way they behave in the entry gap area, the best angles for the precompression stage II and the postcompression stage III with respect to the vertical position (press gap) of the main compression area IV can be controlled by means of a computer system through servo-controlled hydraulic jacks in accordance with the measurement of the feedstock ($y_1$=chip mat thickness) ahead of the entry gap.

It is furthermore advantageous, in that by adapting the entry angle $\beta$ in the short precompression stage II, it is possible to compensate for a different venting behavior of the covering layer without changing the rate of production, in which case the point of contact between the mat and the upper steel band can take place as desired beginning at the upper contact point or thereafter in the direction of transport to the next joint line.

A preferred ratio of the length of the precompression stage II to the length of the postcompression stage III of about 1:2 to 1:4 also results in a corresponding duration of the passage of the board through the entry gap, which advantageously prevents undesirable premature hardening that might result in greater waste due to sanding the covering layer. This positively results in an increase of the strength of the covering layer of the finished board.

It is also considered an advantage in that the precompression stage II is not additionally heated. Due to the accumulated air, and the resultant expansion of the interstices in the chip or fiber mat, thermal conduction between the chips, fibers and particles is poor. In the case of greater heating, this would lead to a more intense premature hardening in the cover layer. According to the invention, therefore, it is not until the postcompression stage III that heat is delivered in a concentrated manner to the already precompressed mat which contains less air.

For the reliable transfer of the feedstock or chip or fiber mat to the bottom steel band, the bottom line F at which the feedstock is deposited is set ahead of the upper feedstock contact line C by the safety margin X (FIGS. 2–5). Surprisingly, this asymmetrical entry of the mat, in contrast to simultaneous and symmetrical contact between the mat and the top and bottom steel bands, results in a greater diagonal air-release cross section $y_2$ in proportion to the pressed board cross section $y_1$. As the boards become thinner, this diagonal section, i.e., at the higher production rates made possible by the process with thinner feedstock, the greater air flow velocity automatically also increases the cross section for the escape of air.

The above-described method can be accomplished by a continuously operating press for producing boards from feedstock, the press including:
 a press table having a heating plate;
 a press ram having a heating plate and being movable relative to the press table to define an adjustable press gap therebetween;
 driving drums;
 idler drums;
 flexible continuous steel bands which are driven by the driving drums and guided by the idler drums around the press table and press ram, the steel bands transferring press pressure from the press table and press ram to the feedstock and drawing the feedstock in a moving direction through the press;
 roller rods having a rotational axis transverse to the moving direction of the feedstock, the roller rods supporting the flexible continuous steel bands;
 an entry adjustment device disposed adjacent the press gap and being movable to define a variable angle entry gap through which the feedstock passes such that the feedstock is subjected to compressive forces, wherein the entry adjustment device includes, first, second and third sections, the first and second sections are connected via a first flexible joint, the second and third sections are connected via a second flexible joint such that the second and third sections are articulated relative to each other, the third section is connected to at least one of the heating plates of the press table and press ram via a third flexible joint, the first, second and third sections via the respective first, second and third flexible joints being adjustable to respective angles $\gamma$, $\beta$ and $\alpha$ relative to a horizontal plane such that as the feedstock passes through the second and third sections it is subjected to compressive forces; and
 means for adjusting the second and third sections relative to the horizontal plane whereby the angles $\gamma$, $\beta$ and $\alpha$ are adjusted, the adjusting means capable of at least one of adjusting the second and third sections so that the angles $\beta$ and $\alpha$ are positive relative to the horizontal plane and adjusting the second and third sections so that the angle $\beta$ of the second section is positive relative to the horizontal plane and the angle $\alpha$ is one of negative and positive relative to the horizontal plane.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIGS. 2, 3, 4 and 5 show representations of the entry gap of a continuously operating press for various thicknesses of the chip mat and variations of the process with reference to FIG. 1, with FIGS. 2.1, 2.2, and 2.3 showing, on an enlarged scale, various arrangements of the bridging plate, roller rods, roller plate, and platens.

DETAILED DESCRIPTION OF THE PREFERRED EMBODIMENTS

Figure 1:
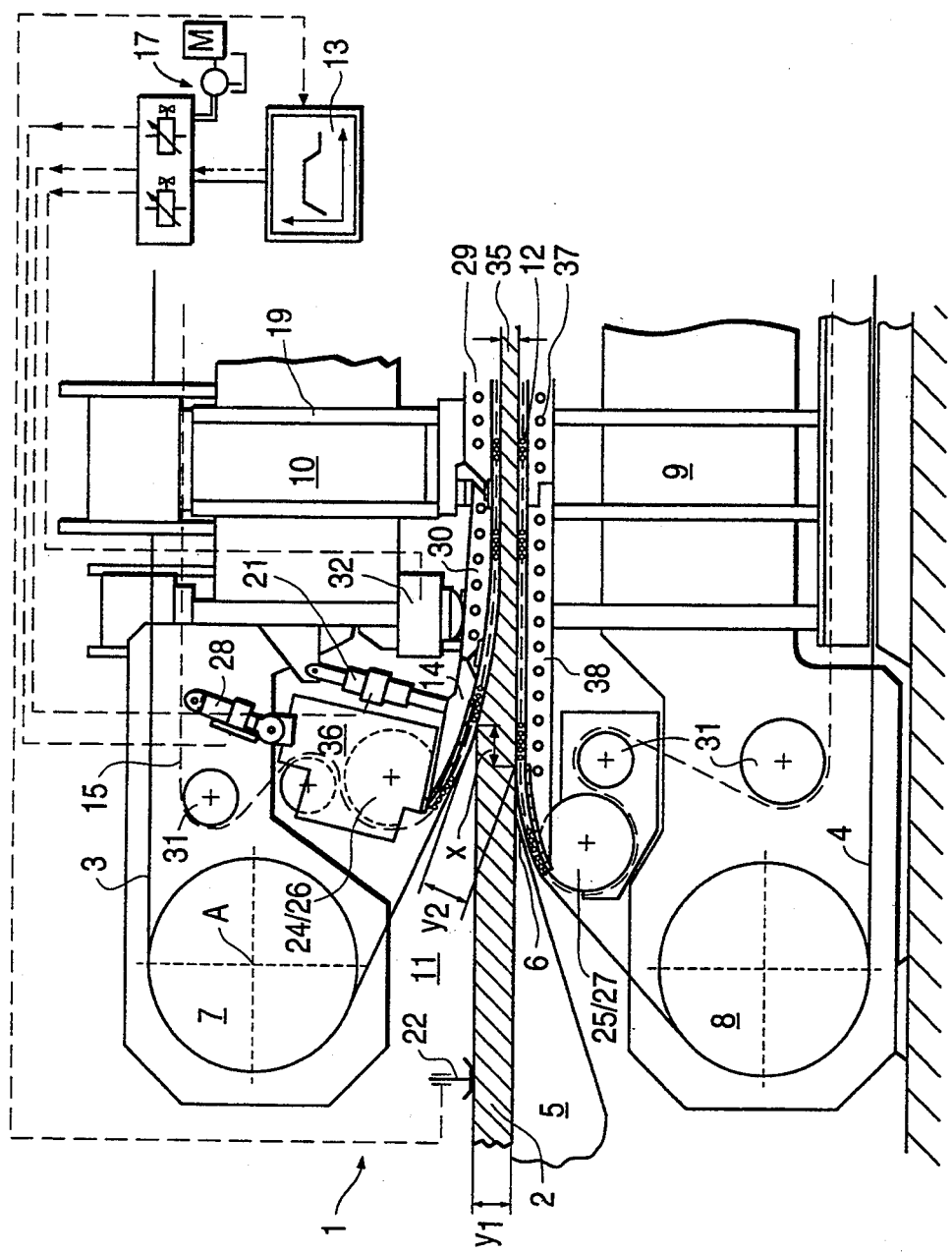
FIG. 1 is a side view of the apparatus according to the invention.

The machinery represented in FIGS. 1 to 5 consists of a continuously operating press 1 having a stock feeding apparatus 5 with a ramp 6 for the feedstock or the chip or fiber mat 2, and a computer 13 for controlling the machinery via a hydraulic servo system 17. The press 1 is represented only by its front portion, that is, the entry for the feedstock, the feeder 5, the entry gap 11 and the entry area including a roller rod alignment section I, a precompression section II, a postcompression section III and a beginning of the main press section IV. The press 1 includes a table 9, a press ram 10 and tension columns connecting them together. To set the press gap 35 between the ram 10 and table 9, the ram 10 is raised and lowered by hydraulic jack systems (not shown) and then locked in the selected position. Steel bands 3 and 4 each run over a driving drum (not shown) (disposed at the end of the press ram 10 and table 9) and respective idler drums 7 and 8 and respectively pass around the ram 10 and the table 9, respectively. To reduce friction between the steel bands 3 and 4 and the corresponding hot plates 29 and 37 mounted on the table 9 and ram 10, respectively, a corresponding apron formed of roller rods 12 circulates with the steel bands 3 and 4. The roller rods 12, have axes of rotation at right angles to the direction of movement of the bands 3, 4 and cover the entire width of the pressing area. The roller rods 12 are held closely together with a given density in roller chains 15 located on both sides of the press 1, and roll against the hot plates 29 and 37 of ram 10 and table 9 on the one side and the steel bands 3 and 4 on the other side, thus carrying the feedstock 2 through the press 1.

It can also be seen in the drawings that the roller rods 12 are positively fed by insertion sprockets 24 and 25, and the roller chains 15 are positively fed by two entry sprockets 26 and 27 respectively disposed alongside the platens 14/30 and the entry hot plate 38, into the horizontal plane of the press. The insertion sprockets 24 are fastened on a shaft on the ram 10 and insertion sprockets 25 on a shaft on the table 9, and the entry sprockets 26 are fastened on a shaft on the ram 10 and the entry sprockets 27 on a shaft on the press table 9. B indicates the beginning of the section (entry tangent) where the roller rods 12 enter, and E the end of the entry section as well as the beginning of the main press section IV. The roller rod movement in the table 9 and ram 10 is guided over the idler rolls 31. To provide a statically perfect division of the chip or fiber feedstock entry area into the roller rod alignment area I, the precompression area II, the postcompression area III and also the main press area IV, the areas I–IV are attached to one another in a positive and form-fitting manner by three flexible joint systems. The setting of the entry gap 11 is variable by varying the compression angles α and β and by the roller rod entry angle γ.

As represented in FIGS. 2 to 5, the pressing range is divided functionally into four sections as follows:

I. The curved roller-rod alignment section in which the roller rods 12 are loosely transferred to the lower steel band.
II. The variably controllable, rectilinear precompression section or low-angle venting of the covering layer.
III. The variably controllable, rectilinear postcompression section for the middle layer, and
IV. Mainly rectilinear main pressing section for the hardening and gauging of the chip or fiber mat, with a controllable profile of the press force or vertical press stroke for the
final compression
venting, drying and
gauging.

Roller Rod Alignment Section I

The chip or fiber mat 2 is transferred by the feeder 5 to the lower steel band 4. The lower entry tangent F (=transfer and starting line for the chip or fiber mat 2 on the lower steel band 4) for the roller rods 12 is set horizontally forward from the upper entry tangent line C (=the starting line for the chip or fiber mat 2 on the upper steel band 3), so that the mat 2, after the lower curving or roller-rod alignment section for the press table 9, is transferred onto the lower steel band without danger of pinching the front edge 6 between the upper and lower steel band 3 and 4. Contact between the chip or fiber mat with the lower and upper steel band thus takes place asymmetrically in accordance with the safety spacing X. Within the convex entry curvature of the upper and lower steel bands 3 and 4, the roller rods 12 are resiliently pressed by the laminated spring 20 against the steel bands 3 and 4.

The sprockets 24 and 26 are attached to a roller plate 16 through the gear box 36. The laminated spring 20 is forced at the gear box adjustment line 33 and the equalizing beam 39 to follow the stroke of the hydraulic jacks 28, several of which are situated along the width of the pressing range. The upper entry curvature (from B to C) resiliently follows the variably adjustable angle β of the precompression section II. The laminated spring 20 can swing freely in the wedge-shaped gap 40 at the platen 14. The gears 24 and 26 are housed in a compact unit in a gear box 36. The gear box 36 and the laminated spring 20 are resiliently connected to the adjoining precompression section II. The gear box 36 together with the laminated spring 20 is supported by hydraulic jacks 28 against the rigid unit of the press ram 10. The hydraulic force of the hydraulic jacks 28 is set so as to be constant, so that the entry tangent B will adapt itself automatically to the variable angle β of the adjoining precompression section II, i.e., the angle γ of the curved upper roller rod entry section between the entry and exit tangent points B and C varies flexibly to correspond to the precompression section II. The transition from the precurved roller rod alignment area I to the straight precompression section II takes place quasi articulately over the exit tangent C of the roller rods 12, which is simultaneously the starting line of the chip and fiber mat 2 on the upper steel band 3.

The local position and the geometry (curvature) of the roller rod insertion and alignment area I with the entry tangent line B (across the width of the gear box 36) of the roller rods 12, and their exit tangent line C vary in accordance with the modified angular positions beta β and alpha α in areas II and III in a flexible and spring-elastic manner. This assures the important function whereby if there is a change in the angles alpha α and beta β, the roller rods 12 transferred by the sprockets 24 orthogonally in the entry tangent line onto the steel band 28 are forced against the steel band 3 by the hydraulic thrusting force of jacks 28. That is, the roller rods 12 remain always resiliently clamped in their orthogonal alignment between band 3 and roller plate 16 through the arc section I. The automatic adaption of the angle γ by the constant thrust of the cylinders 28 produces a change, even though slight, in the radius of curvature R in the entry arc and alignment area I in which the gear box 36 acts through the axis of rotation 34 as a lever on the equalizing beam 30. The modified curvature radius R is thus automatically adjusted by the spring-elastic thrusting function of the spring pack 20.

The Precompression Section II

The straight pressing part of the precompression section II begins at the flexible transition of the exit tangent C and ends at the joint axis D at a spring steel bridging plate 18 bridging the transition to the postcompression section III. The front platen 14 is connected by a joint to the postcompression section III. Depending on the application requirements the most favorable angle β is established at the axis of rotation D of the articulation by hydraulic jacks 21, which in turn thrust against the rigid press ram 10. The desired angle β with respect to the straight platen 30 is detected by the sensor 23. The following β angles, for example, can be set with respect to an α angle of 0:

| | |
|---|---|
| β = +5° | and less for increased compression with respect to the postcompression section III |
| β = approximately 0 | precompression and postcompression sections II and III form a straight line for the lengthened, linear compression section, and |
| β = −4° and more | for a reduced precompression, e.g., with α approximately +5; e.g., for a low angle venting to prevent blow-outs. |

The elastic bridging plate 18 underneath the flexible joint axis D is configured so that it follows the setting of the angle β, i.e., it becomes convex for a positive setting and concave for a negative setting.

The entire entry system is preceded by a motion measuring system which measures the depth of the chip or fiber mat $y_1$ with a depth sensor 22 and feeds the data to the computer 13. These data serve to determine the setting of the hydraulic adjusters 21 and 32 with the assumption that after passing through the safety section X the mat 2 will make contact with the upper steel belt 3 preferably at the upper approach line C of the precompression section II. The upper and lower portions of the precompression section II, e.g., the platen 14 and the front portion of the entry hot plate 38 are preferably unheated.

The Postcompression Section III

The rectilinear pressing section of the postcompression section III is about two to four times longer than the length of the precompression section II. It begins at the joint axis D and ends at joint axis E. Underneath the joint axis E there is a spring-metal bridging plate 18 and the roller plate 16 which serve to support the roller rods 12 and steel band 3 in a concave or convex manner depending on the angle $\alpha$, and conform to the convex or concave deformation at the flexible transition points C, D and E. This press section is heated at the top and bottom in order to supply heat under pressure to the chip or fiber mat 2 which has been substantially compressed in the preceding part of the press. The angle $\alpha$ of the platen 30 articulated on the axis E is set by means of the hydraulic jacks 32. The angle $\alpha$ with respect to the substantially rectilinear main pressing section IV is also detected by means of the sensor 23. The hydraulic jacks 32 also bear against the rigid press ram 10.

The Main Press Section IV

This heated press section is by far the longest press section in comparison to the sections ahead of it, and this is due to the time necessary for the heat to pass from the covering layers into the middle layer and the curing and gauging time which that involves. The press gap 35 (distance) between the substantially rigid press ram 10 and the flat and rigid press table 9 is governed according to the required gross thickness and the progress of the final compression, ventilation, drying and gauging of the board. The varying distance and with it the vertical position of the upper joint axis E is set by hydraulic jacks (not shown) disposed along the main press section IV between the press table 9 and the ram 10.

In FIG. 2 there is shown the continuous pressing operation with an extremely wide entry gap $y_1$. To prevent blowouts, therefore, the precompression angle $\beta$ formed with the platen 14 is adjusted to minus 2° as compared to the postcompression angle $\alpha$ of about +5.0° of the platen 30 providing a steep postcompression.

Figure 3:
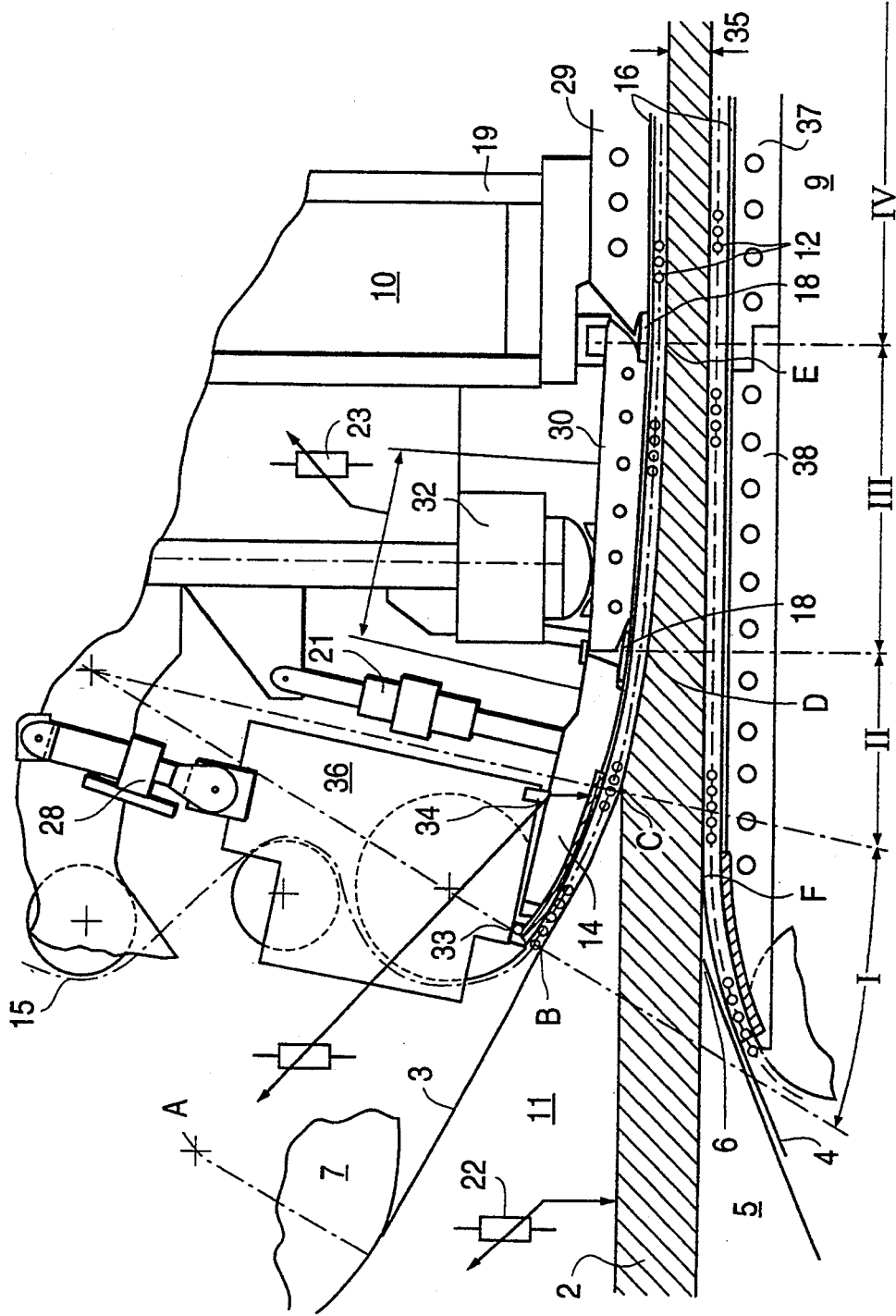
Figure 4:
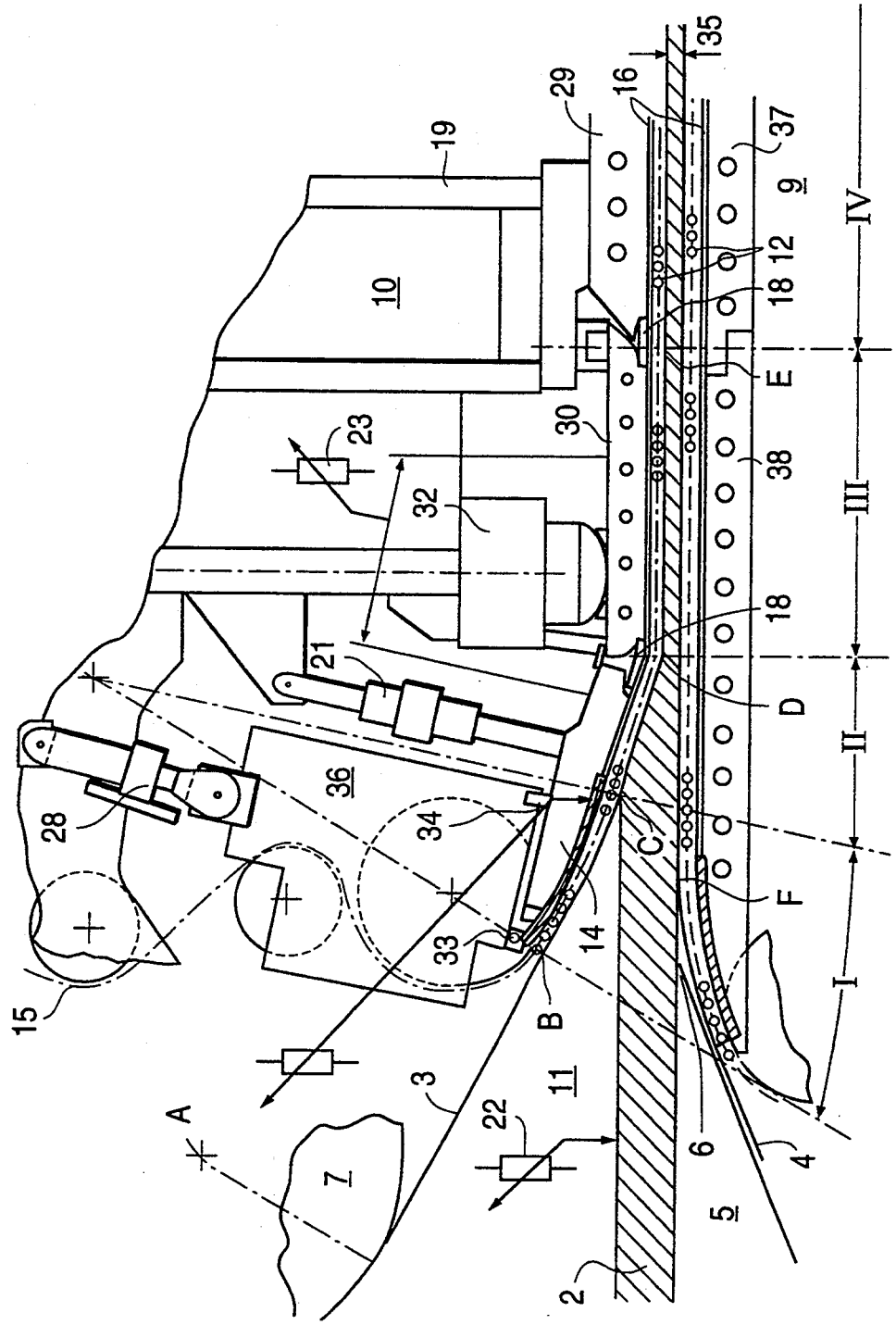

FIG. 3 likewise shows a wide entry gap $y_1$, but a positive setting of angle $\beta$ of about 3°, i.e., the precompression can take place faster and the postcompression at angle $\alpha$ somewhat slower. In the case of a thinner chip and fiber mat $y_1$, as shown in FIG. 4, it is somewhat better to make angle $\alpha$ of platen 30 amount to zero degrees plus, and to let the entire compression be performed at a steep angle $\beta$ at the platen 14.

Figure 5:
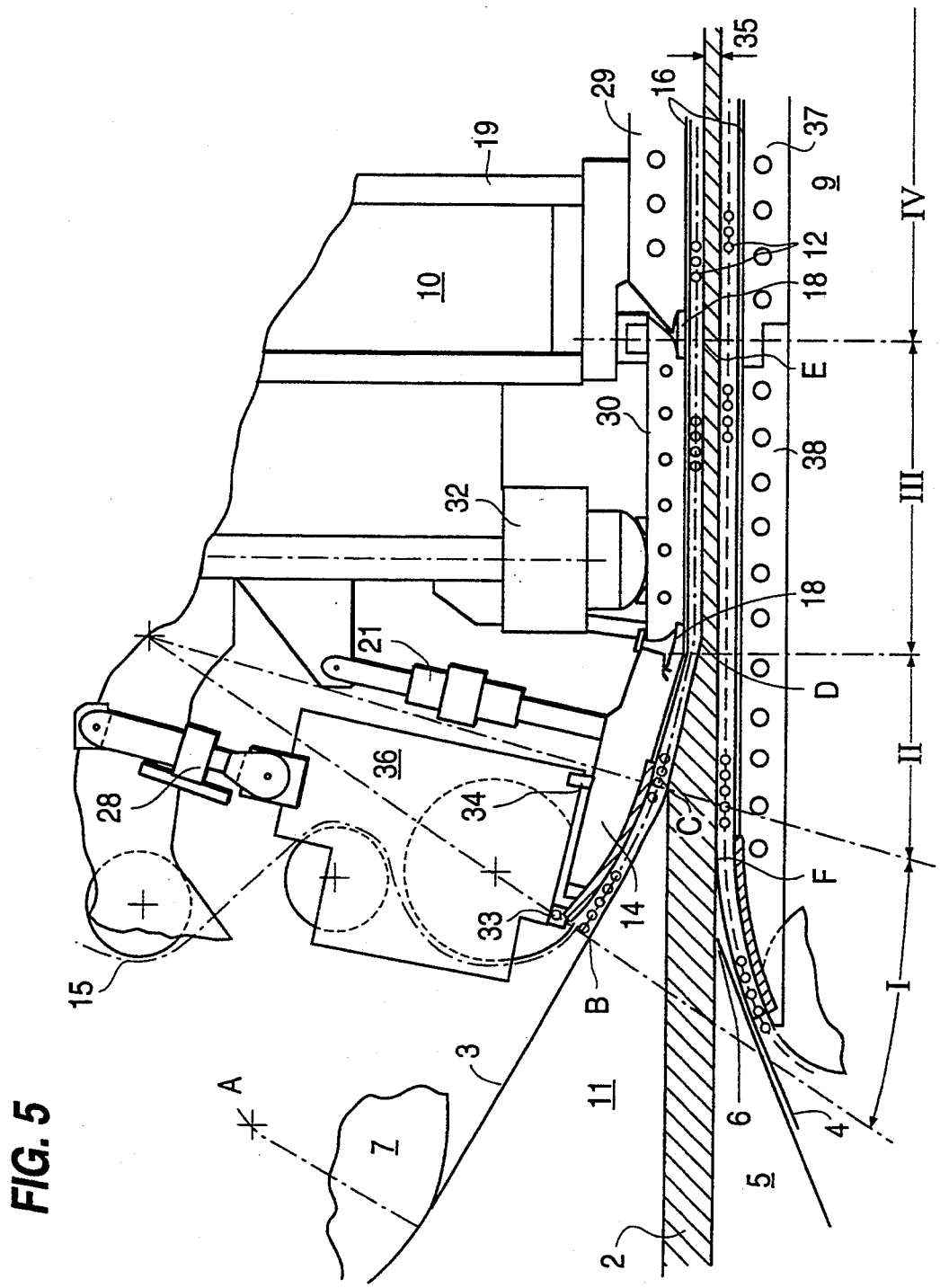

For the production of boards with a high raw density profile in FIG. 5, the platen 30 can advantageously be set with the angle $\alpha$ being negative, so that after a rapid and strong precompression with platen 14 the chip or fiber mat 2 will be relieved of pressure until the beginning of the main pressing section IV.

The axis of rotation E (also D) lies in the center of the train of roller rods 12. The form-fitting thrust of the press force takes place in the bearing sleeves of the joint line C. The spring-elastic transfer plate 18 spans the joint gap of C and if the maximum angle $\alpha$ calls for a convex position it conforms exactly to the radius r in the joint on both sides thereof, thereby forming a gentle curve for the roller rods 12 in the joint area. The radius r corresponds approximately to the radius R in the roller rod alignment area I. R is approximately equal to r and thus is designed about 750 to 1000 times greater than the steel band thickness 3 and thus corresponds to the allowable flexural loads for high-alloy spring steels, that is, at a thickness of the steel band 3 and 4 of for example 2.3 mm, the radi R are approximately equal to r at about 1725 mm to 2300 mm.

Figure 7:
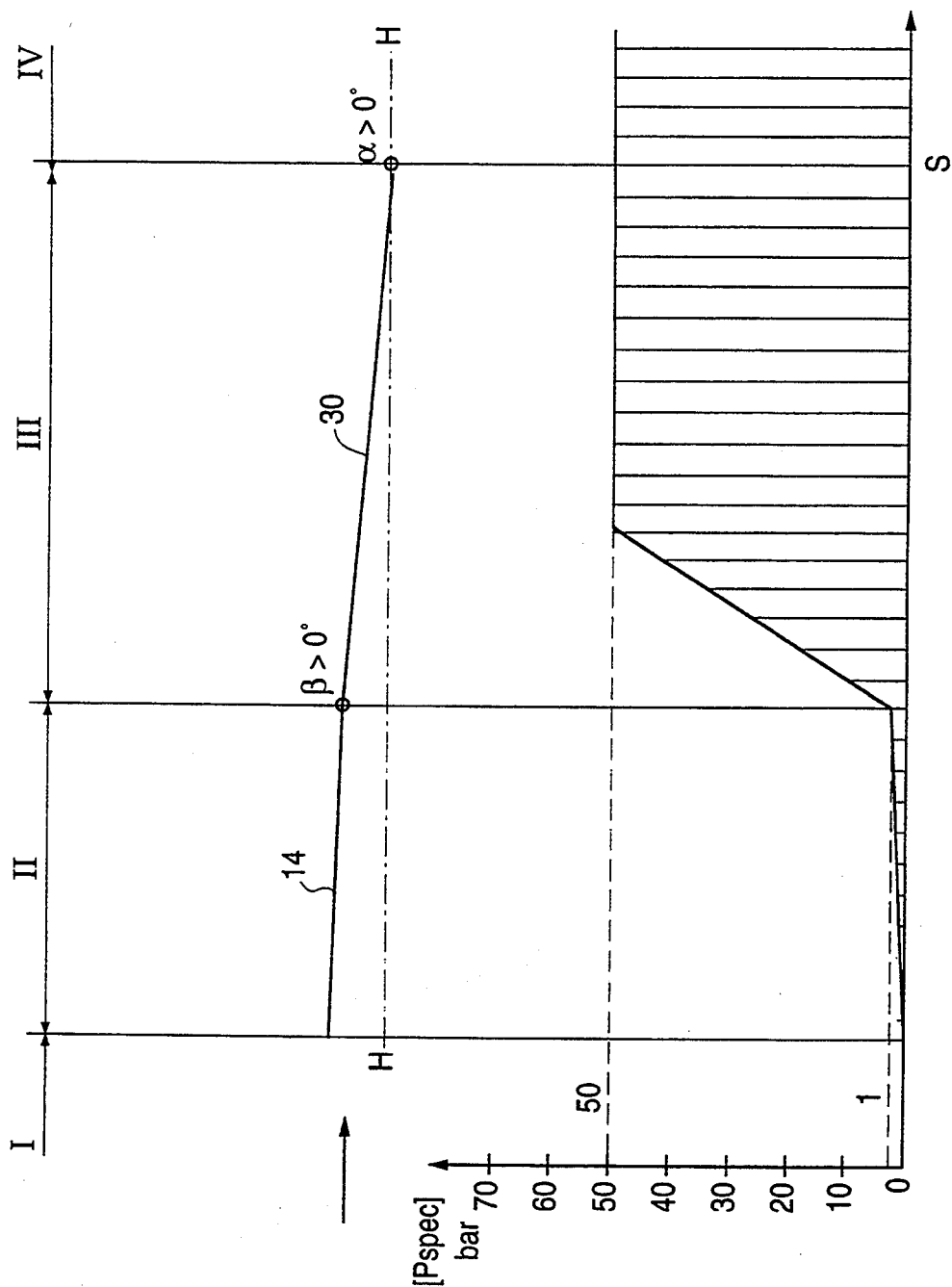
FIG. 7 is a graphic representation of the press force profile in the entry gap of FIG. 2.
Figure 8:
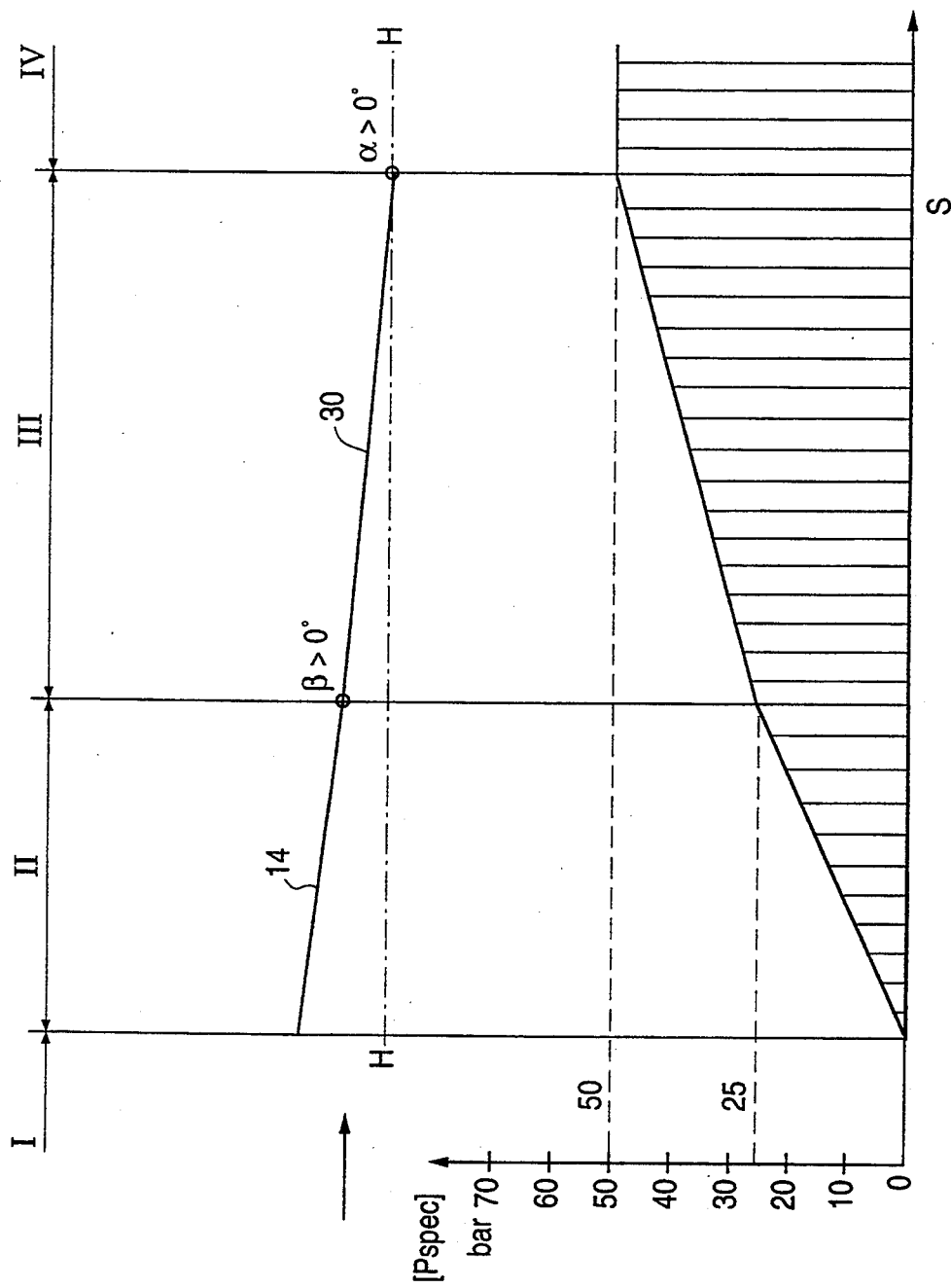
FIG. 8 is a graphic representation of the press force profile in the entry gap of FIG. 3.
Figure 9:
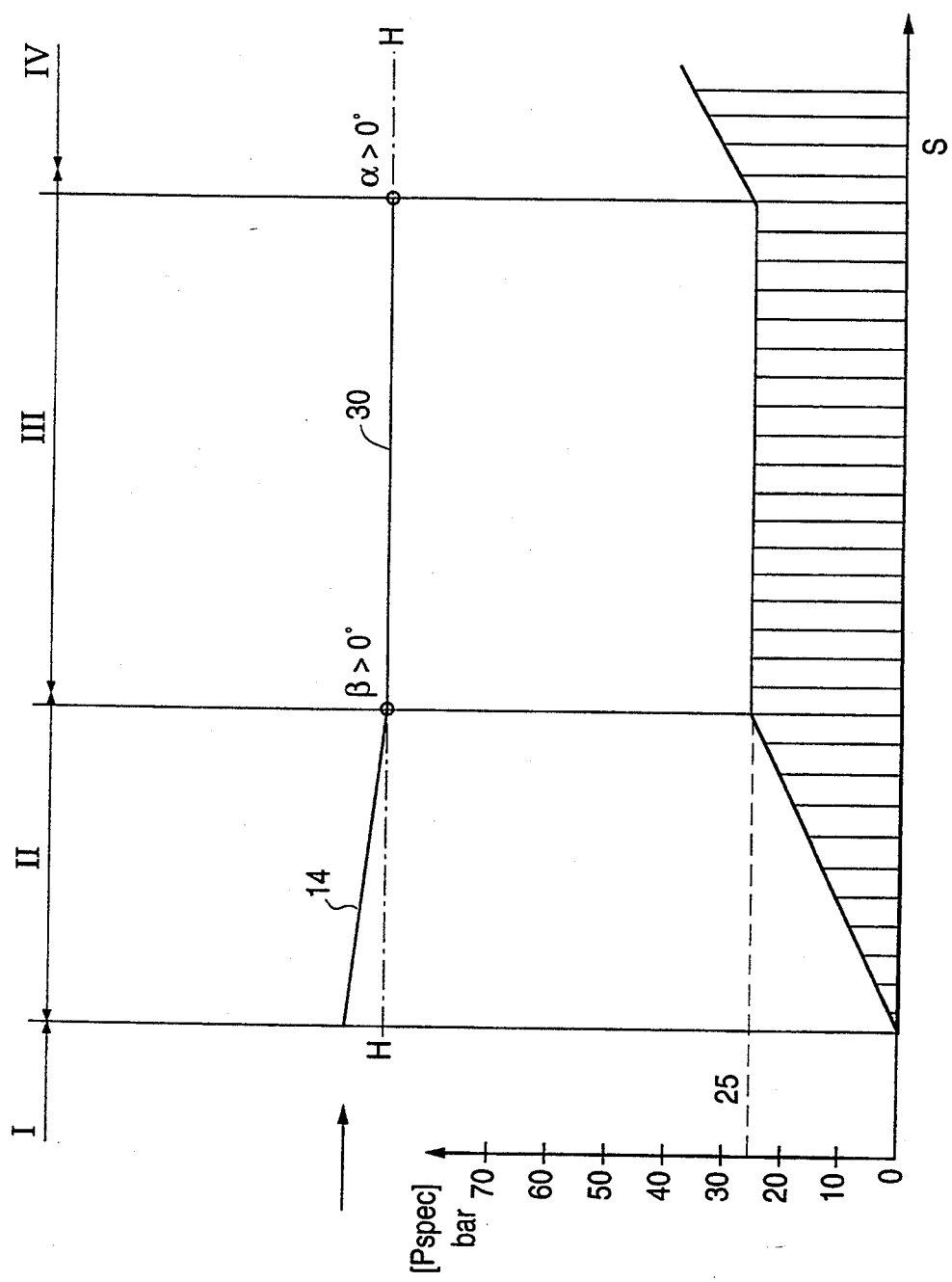
FIG. 9 is a graphic representation of the press force profile in the entry gap of FIG. 4.
Figure 10:
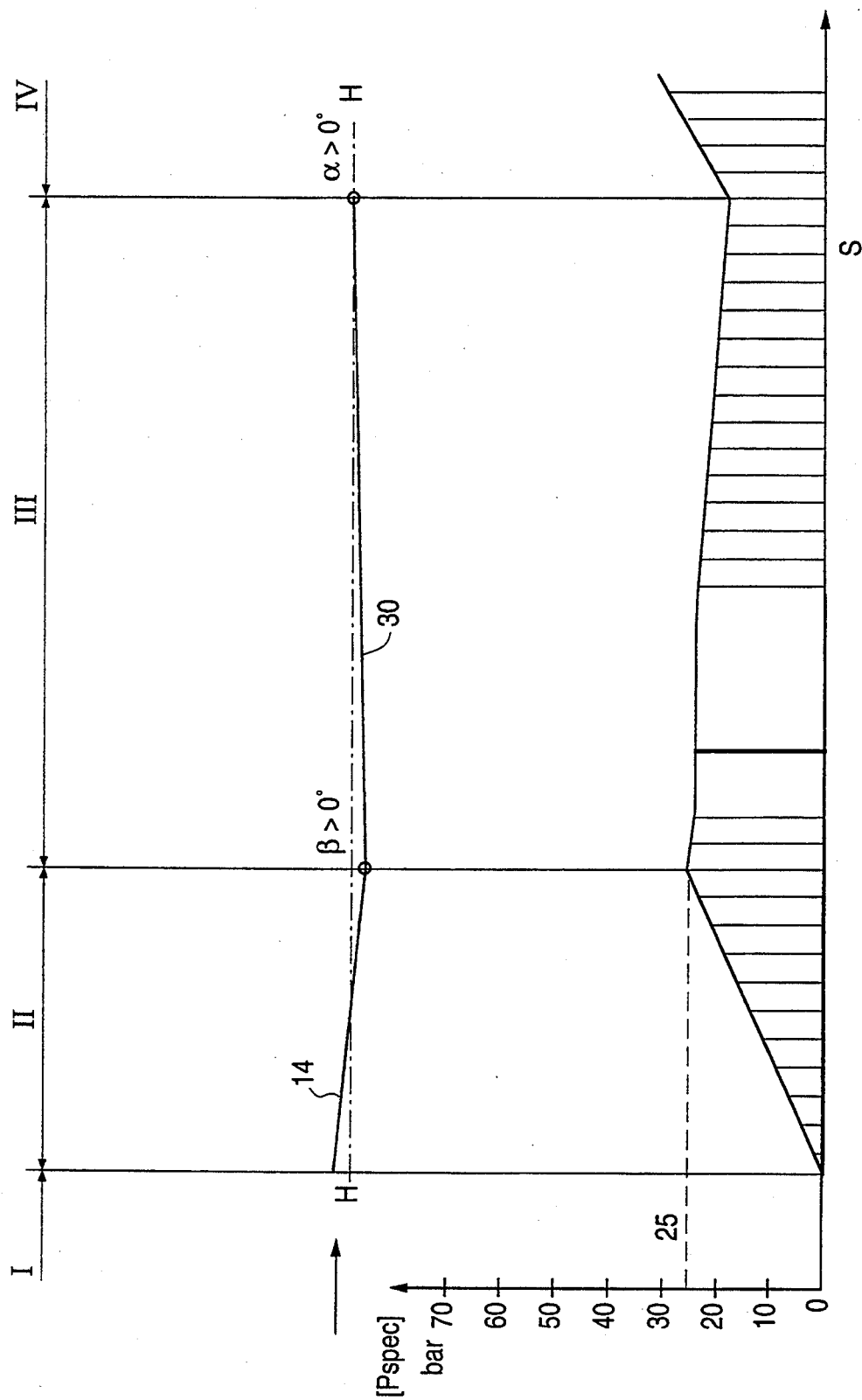
FIG. 10 is a graphic representation of the press force profile in the entry gap of FIG. 5.

In FIGS. 7 to 10 the graphs respectively indicate the pressure profiles at the angles $\alpha$ and $\beta$ of the platens 14 and 30: FIG. 7 for FIG. 2, FIG. 8 for FIG. 3, FIG. 9 for FIG. 4 and FIG. 10 for FIG. 5. $P_{spec}$ indicates the pressure in bars applied at the faces of the platens 14 and 30 and heating plates 29, 37 and 38, and S indicates the press motion. The arrow indicates the working direction and H is the horizontal plane relative to the angles $\alpha$ and $\beta$, especially in the precompression section II and the postcompression section III. The shaded areas indicate the pressure profile of the $\alpha$ and $\beta$ angular positions, especially in the precompression section II and postcompression section III.

Figure 6:
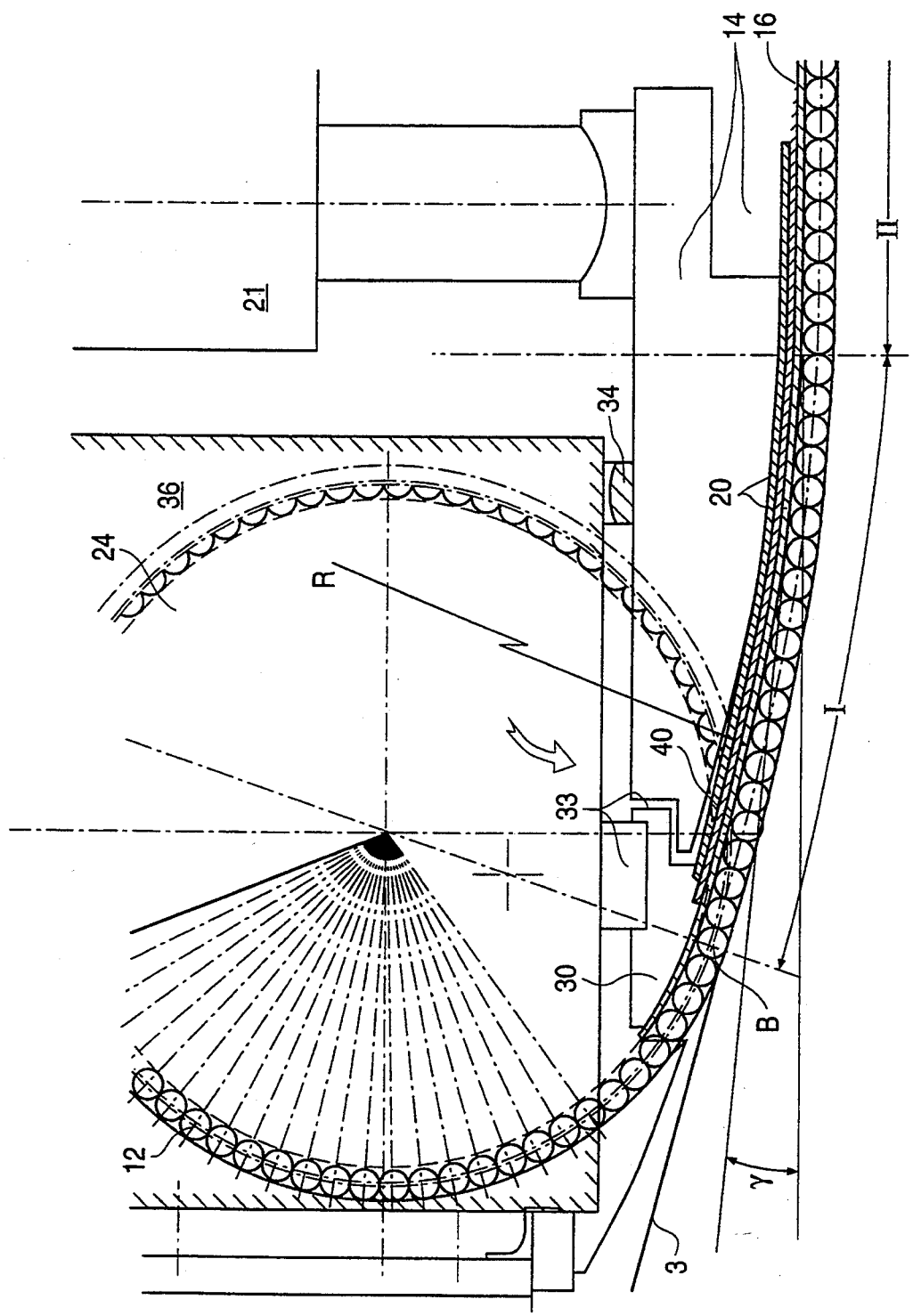
FIG. 6 shows on a larger scale, the platen in the roller rod alignment area I and the precompression stage II.

The shape in the detail of the curved roller rod alignment section I and the transition into the straight precompression section II is plainly indicated in FIG. 6. To provide a resilient roller rod entry, the multiple laminated leaf spring 20, which can consist of two or more leaves, and the likewise resilient roller plate 16, are disposed to be able to swing freely. The equalizing beam 39 is fitted to the gear box 36 through the gear box controlling shaft 33 and the pivot shaft 34. As it can be seen in the drawing, a roller plate 16 is provided as an entry and rolling track for the roller rods 12 on the press table 9 and the press ram 10 over the entire entry range from B to beyond E. It also overlaps the bridging plates 18 at the joints D and E.

For certain technical specifications of the production of pressed material in board form, it may be desirable to vary the entry gap 11 also at the press table 9 by varying the compression angle. Instead of the entry heating plate 38, it is possible within the scope of the invention to arrange the platens 14 and 30 in a manner similar to the press ram 10, and to control them in the same manner.

The angular settings $\alpha$ and $\beta$ are shown exaggerated for greater ease of comprehension.

To achieve a rapid compression of the covering layer of the chip or fiber mat 2, a length of about 300 mm to 600 mm can be considered as a good length for the precompression stage II. All of the surfaces the press table 9 and ram 10 from stages I to IV are covered from the entry of the roller rods 12 up to and including the outlet from the main press area IV with a spring steel roller plate 16. The roller plate 16 provides for flexible support, mainly in the case of convex or concave deformation in the resilient joint area of the front roller rod entry in the roller rod alignment area I, and that of the joint axes C, D and E. The roller plate 16 is underneath to perform the functional task of a measurement, according to which the thickness is about 2 to 2.5 thicker than that of the steel bands 3 and 4, so as to avoid the negative effect of unilateral cold formation. Practice has surprisingly shown that, if this rule is followed, no single-sided key effect due to case-hardening of the spring plate occurs. The minimum hardness of the roller plate 16 is to amount therefore to about 550 Brinell to minimize wear.

The function of a convex or concave setting corresponds to the same function as in the joint axis E. The flexible transition plate 18 underneath the joint axis E is therefore constructed so that (see also FIGS. 2.1, 2.2 and 2.3) it follows the angle, being convex if angle $\beta$ is positive, and concave if it is negative.

The rule for the thickness of the roller plate 16 equal to about 2 to 2.5 times the steel band thickness 3 and 4, results from the function of spanning the gap of the joints at the axes D and E, and the high pressures exerted by the constant rolling of the roller rods 12 with pressing force action with the unilateral cold shaping (dishing effect) especially intensified by the additional pressure when the joint axes D and E are concave as shown in FIG. 2.3, the gaps being greatest when the shape is concave. When the shape is straight and/or concave (FIGS. 2.2 and 2.3) a spring-elastic rolling over the joint gaps (leaf-spring effect) is assured by the additional supporting design of the gap-spanning plate 18.

It can be considered to be an outstanding result of the method and apparatus of the invention that, depending on the practical requirements of the boards and the structure of the chip or fiber mats 2 as well as their performance chiefly in the entry area, it is possible by means of the computer system to use the hydraulic servo system 17, in accordance with the embodiments shown in FIGS. 2 to 5 and in FIGS. 7 to 10, to set the optimum angular positions for the press stages II and III in relation to the vertical position of the main press range IV, in accordance with the measurement $y_1$.

Additional advantages and modifications will be readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A method for the continuous production of boards made from feedstock, the method comprising the steps of:
   A) providing a continuously operating press including a press table having
      a heating plate;
      a press ram having a heating plate and being movable relative to the press table to define an adjustable press gap therebetween;
      driving drums;
      idler drums;
      flexible continuous steel bands which are driven by the driving drums and guided by the idler drums around the press table and press ram, the steel bands transferring press pressure from the press table and press ram to the feedstock and drawing the feedstock in a moving direction through the press;
      roller rods having a rotational axis transverse to the moving direction of the feedstock, the roller rods supporting the flexible continuous steel bands;
      an entry adjustment device disposed adjacent the press gap, the entry adjustment device being movable to define a variable angle entry gap therein through which the feedstock passes such that the feedstock is subject to compression forces, the variable angle entry gap defined by at least first and second independently variable angle entry gap portions, said first and second independently variable angle entry gap portions being flexibly connected to each other and said second independently variable angle entry gap portion being flexibly connected at least to one of the heating plates of the press table and press ram;
   B) moving the feedstock through the variable angle entry gap;
   C) setting the first independent variable entry gap at a first angular value which falls in a first range from approximately 0.5° to approximately 5.0° relative to a horizontal plane thereby compressing the feedstock under first compressive forces as the feedstock is moved through the first independent variable entry gap portion;
   D) setting the second independent variable entry gap portion at a second angular value which falls in a second range from approximately 7.0° to approximately 1.0° relative to the horizontal plane thereby compressing the feedstock under second compressive forces as the feedstock is moved through the second independent variable entry gap portion.

2. A method as recited in claim 1, further comprising setting the first and second angular values whereby the first and second connections are each bent in at least one of a convex shape and a concave shape.

3. A method as recited in claim 1, further comprising moving the feedstock through the first and second independently variable entry gap portions over respective first and second periods of time, wherein a ratio of the first period of time to the second period of time is within a time ratio range of approximately 1:2 to 1:4.

4. A method as recited in claim 1, further comprising heating the feedstock during step (D) in addition to any heat of compression, and wherein the compression in the first variable entry gap portion is accomplished in the absence of any heat except for heat of compression.

5. A method as recited in claim 1, further comprising moving the feedstock through the variable angle entry gap so that the feedstock first contacts a first one of the steel bands at a first point and subsequently contacts on a second one of the steel bands at a second point, and wherein the first and second points are separated by a safety distance as measured in the moving direction of the feedstock such that a length of a line connecting the first and second points is longer than a cross section of the feedstock.

* * * * *